US012118319B2

United States Patent
Xu et al.

(10) Patent No.: US 12,118,319 B2
(45) Date of Patent: Oct. 15, 2024

(54) DIALOGUE STATE REWRITING AND REPLY GENERATING METHOD AND SYSTEM, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Jun Xu, Beijing (CN); Zeming Liu, Beijing (CN); Zeyang Lei, Beijing (CN); Zhengyu Niu, Beijing (CN); Hua Wu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 263 days.

(21) Appl. No.: 17/655,772

(22) Filed: Mar. 21, 2022

(65) Prior Publication Data
US 2023/0029687 A1 Feb. 2, 2023

(30) Foreign Application Priority Data
Jul. 28, 2021 (CN) .......................... 202110857894.6

(51) Int. Cl.
G06F 40/35 (2020.01)
G06F 40/56 (2020.01)
G06N 5/02 (2023.01)

(52) U.S. Cl.
CPC .............. G06F 40/35 (2020.01); G06F 40/56 (2020.01); G06N 5/02 (2013.01)

(58) Field of Classification Search
None
See application file for complete search history.

(56) References Cited

U.S. PATENT DOCUMENTS

| 7,610,556 B2* | 10/2009 | Guo | ......................... | G10L 15/22 |
| | | | | 715/705 |
| 2006/0206333 A1* | 9/2006 | Paek | ....................... | G10L 15/22 |
| | | | | 704/E15.04 |

(Continued)

FOREIGN PATENT DOCUMENTS

| CN | 110070862 A | 7/2019 |
| CN | 110704641 A | 1/2020 |

(Continued)

OTHER PUBLICATIONS

Rastogi et al. "Scaling Multi-Domain Dialogue State Tracking via Query Reformulation". arXiv: 1903.05164v3 [cs.CL] Mar. 29, 2019 (Year: 2019).*

(Continued)

Primary Examiner — Jesse S Pullias
(74) Attorney, Agent, or Firm — Kwan & Olynick LLP

(57) ABSTRACT

The present disclosure provides a dialog method and system, an electronic device and a storage medium, and relates to the field of artificial intelligence (AI) technologies such as deep learning and natural language processing. A specific implementation scheme involves: rewriting a corresponding dialog state based on received dialog information of a user; determining to-be-used dialog action information based on the dialog information of the user and the dialog state; and generating a reply statement based on the dialog information of the user and the dialog action information. According to the present disclosure, the to-be-used dialog action information can be determined based on the dialog information of the user and the dialog state; and then the reply statement is generated based on the dialog action information, thereby providing an efficient dialog scheme.

7 Claims, 5 Drawing Sheets

(56) References Cited

U.S. PATENT DOCUMENTS

| | | | |
|---|---|---|---|
| 2015/0095033 A1* | 4/2015 | Boies | G10L 15/1815 |
| | | | 704/257 |
| 2015/0379074 A1* | 12/2015 | Marschner | G06F 16/353 |
| | | | 707/706 |
| 2018/0137854 A1* | 5/2018 | Perez | G06F 40/35 |
| 2019/0034780 A1* | 1/2019 | Marin | G06F 16/3329 |
| 2019/0213284 A1* | 7/2019 | Anand | G06F 3/0484 |

FOREIGN PATENT DOCUMENTS

| | | |
|---|---|---|
| CN | 112307188 A | 2/2021 |
| CN | 112364147 A | 2/2021 |
| CN | 112487173 A | 3/2021 |
| WO | 2020177282 A1 | 9/2020 |
| WO | 2020178856 A1 | 9/2020 |

OTHER PUBLICATIONS

Dongkeon Lee, et al., The ChatBot Feels You—A Counseling Service Using Emotional Response Generation, Mar. 20, 2017, 4 pgs.

Lu Wang, et al., Intelligent Dialogue of Film Knowledge Based on Deep Learning, Mar. 25, 2020, 4 pgs.

Notice of allowance for CN202110857894.6, issued on May 10, 2023, 5 pgs.

* cited by examiner

DIALOGUE STATE REWRITING AND REPLY GENERATING METHOD AND SYSTEM, ELECTRONIC DEVICE AND STORAGE MEDIUM

The present application claims the priority of Chinese Patent Application No. 202110857894.6, filed on Jul. 28, 2021, with the title of "DIALOG METHOD AND SYSTEM, ELECTRONIC DEVICE AND STORAGE MEDIUM". The disclosure of the above application is incorporated herein by reference in its entirety.

FIELD OF THE DISCLOSURE

The present disclosure relates to the field of computer technologies, in particular to the field of artificial intelligence (AI) technologies such as deep learning and natural language processing, and specifically to a dialog method and system, an electronic device and a storage medium.

BACKGROUND OF THE DISCLOSURE

With the development of the AI technologies, more and more AI-based dialog systems emerge.

For example, in an existing AI-based dialog system, a dialog intent that may be involved during a dialog, possible slots under the intent, and a corresponding response manner may be predefined. During a dialog with a user, the dialog system may detect a slot hit by the dialog of the user based on the predefined information, identify the user's dialog intent, and respond to the user in a response manner corresponding to the dialog intent.

SUMMARY OF THE DISCLOSURE

The present disclosure provides a dialog method and system, an electronic device and a storage medium.

According to one aspect of the present disclosure, a dialog method is provided, wherein the method includes:
rewriting a corresponding dialog state based on received dialog information of a user;
determining to-be-used dialog action information based on the dialog information of the user and the dialog state; and
generating a reply statement based on the dialog information of the user and the dialog action information.

According to another aspect of the present disclosure, an electronic device is provided, including:
at least one processor; and
a memory communicatively connected with the at least one processor;
wherein the memory stores instructions executable by the at least one processor, and the instructions are executed by the at least one processor to enable the at least one processor to perform a dialog method, wherein the dialog method includes:
rewriting a corresponding dialog state based on received dialog information of a user;
determining to-be-used dialog action information based on the dialog information of the user and the dialog state; and
generating a reply statement based on the dialog information of the user and the dialog action information.

According to still another aspect of the present disclosure, there is provided a non-transitory computer readable storage medium with computer instructions stored thereon, wherein the computer instructions are used for causing a computer to perform a dialog method, wherein the dialog method includes:
rewriting a corresponding dialog state based on received dialog information of a user;
determining to-be-used dialog action information based on the dialog information of the user and the dialog state; and
generating a reply statement based on the dialog information of the user and the dialog action information.

According to the technology of the present disclosure, a more efficient dialog scheme is provided.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute limitations on the present disclosure. In the drawings.

DETAILED DESCRIPTION OF PREFERRED EMBODIMENTS

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

Obviously, the embodiments described are some of rather than all of the embodiments of the present disclosure. All other embodiments acquired by those of ordinary skill in the art without creative efforts based on the embodiments of the present disclosure fall within the protection scope of the present disclosure.

It is to be noted that the terminal device involved in the embodiments of the present disclosure may include, but is not limited to, smart devices such as mobile phones, Personal Digital Assistants (PDAs), wireless handheld devices, and Tablet Computers. The display device may include, but is not limited to, devices with a display function such as personal computers and televisions.

In addition, the term "and/or" herein is merely an association relationship describing associated objects, indicating that three relationships may exist. For example, A and/or B indicates that there are three cases of A alone, A and B together, and B alone. Besides, the character "/" herein generally means that associated objects before and after it are in an "or" relationship.

Figure 1:
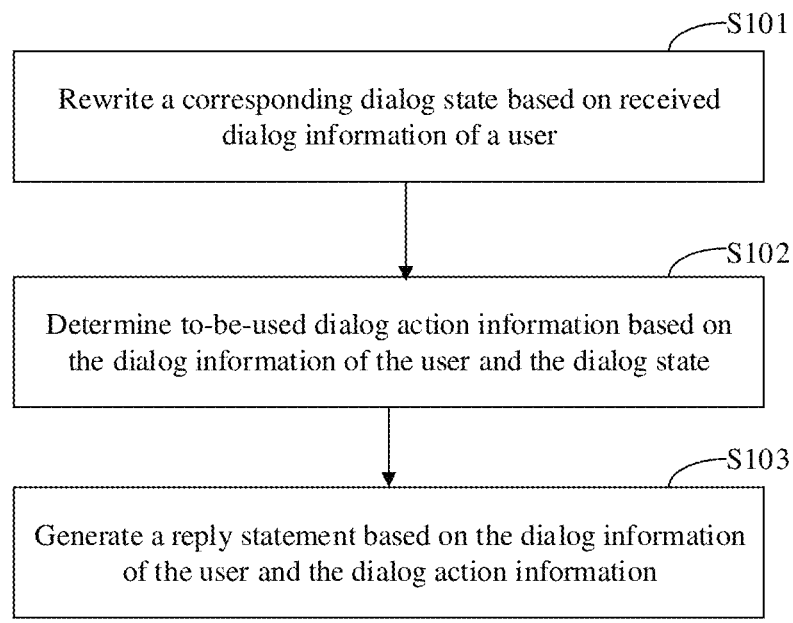
FIG. 1 is a schematic diagram according to a first embodiment of the present disclosure.

FIG. 1 is a schematic diagram according to a first embodiment of the present disclosure. As shown in FIG. 1, a dialog method according to this embodiment may specifically include the following steps.

In S101, a corresponding dialog state is rewritten based on received dialog information of a user.

In S102, to-be-used dialog action information is determined based on the dialog information of the user and the dialog state.

In S103, a reply statement is generated based on the dialog information of the user and the dialog action information.

The dialog method according to this embodiment may be performed by an intelligent dialog system. In this embodiment, a round of dialog between a user and an intelligent dialog system is taken as an example. In a specific dialog scenario, the intelligent dialog system first receives dialog information of the user and rewrites a corresponding dialog state based on the dialog information of the user. The dialog state in this embodiment is configured to record information of a current dialog. The rewriting in this embodiment includes operations such as adding, deleting, or modifying. The rewriting is intended to update the dialog information to the corresponding dialog state. This step may also be considered to normalize the dialog information for subsequent dialog processing based on the dialog state. The dialog state in this embodiment is configured to store current dialog information based on the intent, for example, an entity or task name corresponding to the intent, characteristics corresponding to the intent in the current dialog information, and other related information.

Next, the intelligent dialog system may also determine to-be-used dialog action information based on the dialog information of the user and the dialog state. The dialog action information may be configured to identify a reply policy to be used in the current dialog. Further, the intelligent dialog system according to this embodiment may also generate a reply statement based on the dialog information of the user and the dialog action information, and feed the reply statement back to the user to realize a dialog.

In practical applications, the intelligent dialog system may complete a plurality of rounds of dialogs with the user in the above manner. In the plurality of rounds of dialogs, the intelligent dialog system is required to take the initiative to adopt a dialog policy formed by a plurality of dialog actions to realize a dialog with the user. At the beginning of the dialog, the dialog information of the user may only be a vague generic requirement. In the plurality of rounds of dialogs, through the dialogs with the intelligent dialog system, the user's understanding of requirement-related background knowledge may be improved, and the user's exact requirements may be clarified and refined during the understanding. Based on this, the intelligent dialog system according to this embodiment can provide decision-making-level and execution-level advices. Therefore, the intelligent dialog system according to this embodiment may also be called an Intelligent Consultant System (ICS).

With the dialog method in this embodiment, during a dialog with a user, dialog action information can be determined based on dialog information of the user and a corresponding rewritten dialog state, and a replay statement can be generated based on the dialog information of the user and the determined dialog action information, so as to realize the dialog with the user, which effectively improves the efficiency of the dialog. Moreover, the user's generic requirements can also be well met, which can effectively improve the user's experience.

Figure 2:
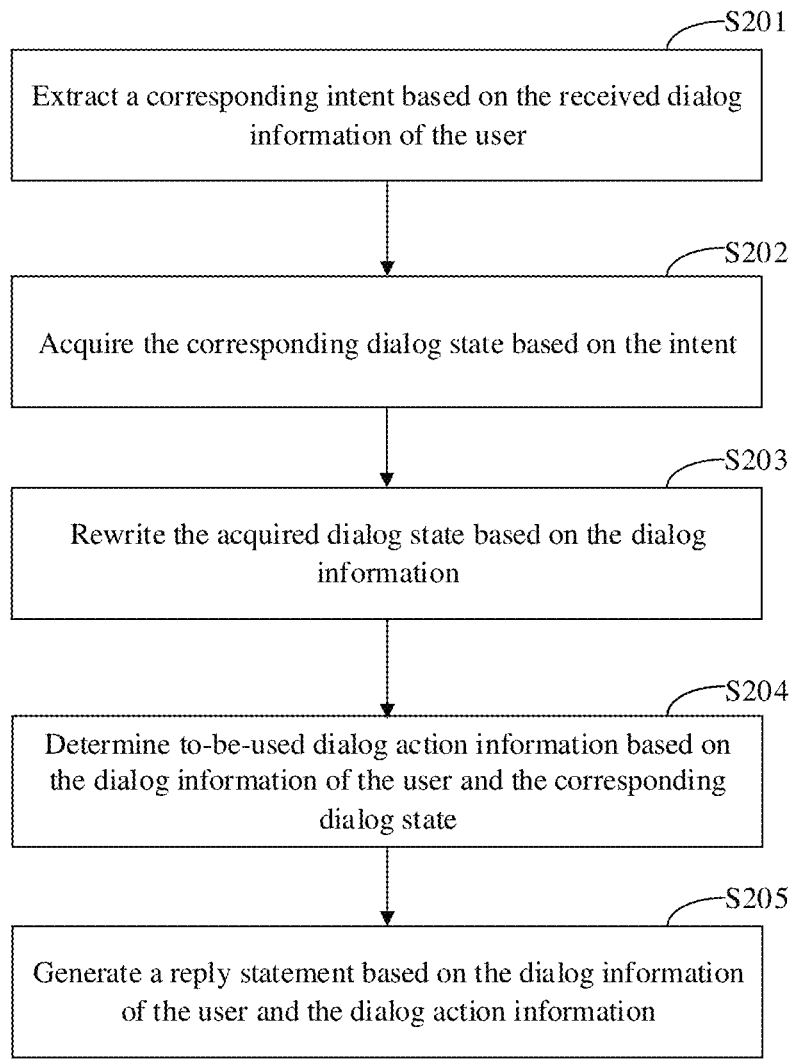
FIG. 2 is a schematic diagram according to a second embodiment of the present disclosure.

FIG. 2 is a schematic diagram according to a second embodiment of the present disclosure. As shown in FIG. 2, a dialog method according to this embodiment may specifically include the following steps.

In S201, a corresponding intent is extracted based on the received dialog information of the user.

The corresponding intent extracted in this step may be directly extracted from the dialog information of the user or summarized based on the dialog information of the user.

In use, specifically, the corresponding intent may be extracted based on the received dialog information of the user by using a pre-trained rewriting model. For example, for the dialog information of the user, the dialog information of the user may be expressed in the form of a vector by using a pre-trained expression model, and the vectorized dialog information of the user is inputted into the rewriting model. The rewriting model may extract the intent corresponding to the dialog information of the user based on the inputted information.

In S202, the corresponding dialog state is acquired based on the intent.

In a specific implementation, this step may include the following steps.

In (a1), it is detected whether the intent is a new intent; if yes, step (b1) is performed; and otherwise, step (d1) is performed.

In (b1), a corresponding intent unit is retrieved from an intent knowledge graph.

In (c1), the corresponding dialog state is created based on the retrieved intent unit.

In (d1), the dialog state corresponding to the intent is retrieved from a historical state library of the user.

A dialog between the user and the intelligent dialog system may include a plurality of rounds of dialogs, and the plurality of rounds of dialogs may involve only one intent or a plurality of intents. For example, when the user is in a bad mood, an intent of chatting with the intelligent dialog system may be just chatting at first to relieve the mood. By constantly chatting with the intelligent dialog system, the user may be guided to change the intent and prepare to travel or buy things. In this embodiment, in order to efficiently manage dialogs, there is a need to detect whether the intent of each piece of dialog information of the user is a new intent at any time by using the dialog state to manage the dialog information. If yes, there is a need to retrieve a corresponding intent unit from an intent knowledge graph to create a corresponding dialog state. If no, the corresponding dialog state is retrieved from a historical state library of the user.

The intent unit in this embodiment is of a three-layer frame unit structure. The first layer may be a name of an entity or a task. An entity object is a name of a person, and the name of the task may be a name with a clear task such as travel, buy fruit or book air tickets. The second layer may be classification information related to the entity or task of the first layer. For example, when the entity is a star, the classification of the second layer may include feature names such as songs, movies and representative works. If the first layer is to buy fruit, the classification of the second layer may include feature names such as fruit name, unit price and quantity. If the first layer is to book air tickets, the classification of the second layer may include feature names such as airport name and departure time. The third layer may include common expression statements around features of the second layer. For example, some sentences with a template function may be stored, such as opening sentences of an entity or a task corresponding to the current intent. In another example, some popular comment statements related to the entity corresponding to the intent may also be stored.

The dialog state in this embodiment is established based on the intent unit. For example, information may be stored in the form of key-Value pairs based on box forms. Information of the first layer, the second layer and the third layer of the intent unit may be stored. The entity or task of the first layer of the intent unit is stored in the keys, and a specific task or entity name is stored in the corresponding Values. Features in the second layer of the intent unit are all stored in the keys, and specific content of the corresponding features is stored in the corresponding Values. When the dialog state is initially created based on the intent unit, the dialog state box includes only the values of the keys and the values of the corresponding Values are all null.

In addition, optionally, the second layer in the intent unit may also store guide items as features. Specifically, specific information of the guide items is stored in the third layer. The guide items are configured to indicate a set of all next target intent units that may be moved on after the intent corresponding to the current intent unit is completed. For example, it may be identified by the name of the entity or task in the first layer of each target intent unit. Correspondingly, when the corresponding dialog state is created based on the intent unit, the guide item is stored in the Key as a feature, and a corresponding set of next target intent units is stored in the dialog state as a Value.

The intent knowledge graph in this embodiment may include a plurality of intent units, which may be specifically obtained by mining information of historical dialogs with all users. The guide item in each intent unit may serve as an edge connecting different intent units.

Dialog states corresponding to all intents involved in all dialogs between the user and the intelligent dialog system may be stored in the historical state library of the user in this embodiment. Moreover, final information involved in the dialog of the user with the corresponding intent may be recorded in each dialog state. For example, feature information such as a name, a unit price, a quantity, a purchase platform and corresponding date of the fruit each time the user buys may be recorded in the intent unit in which the name of the task is to buy fruit.

Regardless of whether the intent corresponding to the dialog information of the user is a new intent, the dialog state corresponding to the dialog information of the user may be accurately acquired in the above manner. Then, the subsequent dialog may be accurately and efficiently performed based on the dialog state.

In S203, the acquired dialog state is rewritten based on the dialog information; and step S204 is performed.

For example, specifically, if the dialog information involves a feature name of a Key record in the dialog state, feature information corresponding to the key in the dialog information may be written to a corresponding Value position in the dialog state. If the dialog information involves deleting the previous dialog information based on the understanding of the dialog information, feature information in the previous dialog recorded in the dialog state may be deleted. If the dialog information involves modifying the previous dialog information, the feature information in the previous dialog recorded in the dialog state may be modified.

Specifically, step S202 and step S203 may also be performed in the rewriting model.

In S204, to-be-used dialog action information is determined based on the dialog information of the user and the corresponding dialog state; and step S205 is performed.

For example, this step may specifically include the following manners.

(1) The to-be-used dialog action information is determined based on the dialog information of the user and the intent corresponding to the dialog information recorded in the dialog state.

(2) The to-be-used dialog action information is determined based on the dialog information of the user, the intent corresponding to the dialog information recorded in the dialog state and a dialog guide item recorded in the dialog state.

(3) The to-be-used dialog action information is determined based on the dialog information of the user and the dialog state and with reference to historical dialog information of a current dialog of the user, historical memory information of the user and/or attribute information of the user.

The dialog in this embodiment may be a plurality of rounds of dialogs. The historical information of the current dialog refers to previous information of the dialog prior to the current user dialog information in the current dialog. The historical memory information of the user may refer to all historical dialog information of the user prior to the current dialog, including dialogs of intents corresponding to the dialog information of the user or dialogs of other intents. The attribute information of the user may be some related attribute information of the user stored according to all the information of historical dialogs with the user, such as the user's interest, age, graduate school and other basic information. In this embodiment, the current dialog information of the user, the historical dialog information and the attribute information of the user may be stored in a memory module. Regardless of the historical dialog information of the user, the historical memory information of the user or the attribute information of the user, acquisition of the user's personal information is authorized by the user, so as to provide the user with more efficient services. Acquisition, storage and application of such personal information comply with relevant laws and regulations, and do not violate public order and moral.

It is to be noted that, in the manner (4), information in the dialog state used in decision-making may be in either (1) or (2).

In this embodiment, the to-be-used dialog action information may be determined based on the dialog information of the user and the corresponding dialog state by using a pre-trained decision-making model.

If the dialog information of the user has a clear intent, for example, "I want to listen to singer X's song Y", the to-be-used dialog action information may be determined based on the dialog information of the user and the intent recorded in the dialog state. In this case, the corresponding dialog action information may be: Play singer X's song Y.

In addition, if the dialog information of the user indicates that the task of the current intent has been completed, for example, the dialog information of the user is "OK, I see", it may be determined according to the dialog information of the user that the current intent has been completed, and the to-be-used dialog action information may be determined based on the intent corresponding to the dialog information recorded in the dialog state and the dialog guide item recorded in the dialog state. The dialog action information in this case may be policy information initiated based on the dialog guide item recorded in the dialog state, which may actively guide the user to start another type of dialogs. In this manner, after the user completes one thing, the intelligent dialog system may also actively guide the user to do another thing, which further enriches the function of the intelligent dialog system and improves an effect of dialoguing with the user.

Moreover, further, the intelligent dialog system may also refer to the historical dialog information of the user recorded in the dialog state when determining the to-be-used dialog action information, so that the user can be guided more effectively. For example, the dialog information of the user is "I want to buy some apples". The intelligent dialog system extracts the user's intent in this dialog being to buy apples, and may find from the historical dialog information of the user that the user has purchased Fuji apples before. In this case, the used dialog action information determined may be "Ask the user whether to still buy Fuji apples".

Further, when any of the above dialog action information is used for decision-making, reference may also be made to the historical dialog information of the current dialog of the user, the historical memory information of the user and/or the attribute information of the user, so as to determine the dialog action information more intelligently, reasonably and effectively.

In addition, optionally, it may also be detected in real time during the dialog with the user whether the dialog action information of the user includes attribute information of the user. If yes, the attribute information of the user is stored in the memory module. Some detection rules may be configured for the detection of the attribute information. For example, a field name of the attribute information or a rule that the attribute information conforms to may be configured, so as to detect the attribute information effectively.

In S205, a reply statement is generated based on the dialog information of the user and the dialog action information.

In this embodiment, to enable the generated reply statement to be more natural and coherent with the context, the reply statement may be generated by referring to the dialog information of the user and the dialog action information. Further, in order to enrich a corpus required for generating the reply statement, in this embodiment, on the basis of referring to the dialog information of the user and the dialog action information, the reply statement may be further generated by referring to the intent unit corresponding to the intent of the dialog information of the user. For example, the reply statement may be generated by referring to a common expression statement stored in the third layer of the intent unit corresponding to the intent of the dialog information of the user, so that the generated reply statement is more natural and richer in content.

Specifically, the reply statement may be generated based on the dialog information of the user and the dialog action information by using a pre-trained reply generation model.

In this embodiment, by using the rewriting model, the decision-making model and the reply generation model, the dialog capability of the intelligent dialog system may be further enhanced and the effect of dialoguing with the user may be improved.

It is to be noted that, in the embodiment of the present disclosure, the intelligent dialog system may acquire the dialog information of the user in various open and legal manners, which may be, for example, acquired from public data sets or acquired from the user with the user's authorization. The dialog process in the embodiment of the present disclosure is performed after the user's authorization, and its generation process complies with relevant laws and regulations. The dialog in the embodiment of the present disclosure is not aimed at a specific user.

Figure 3:
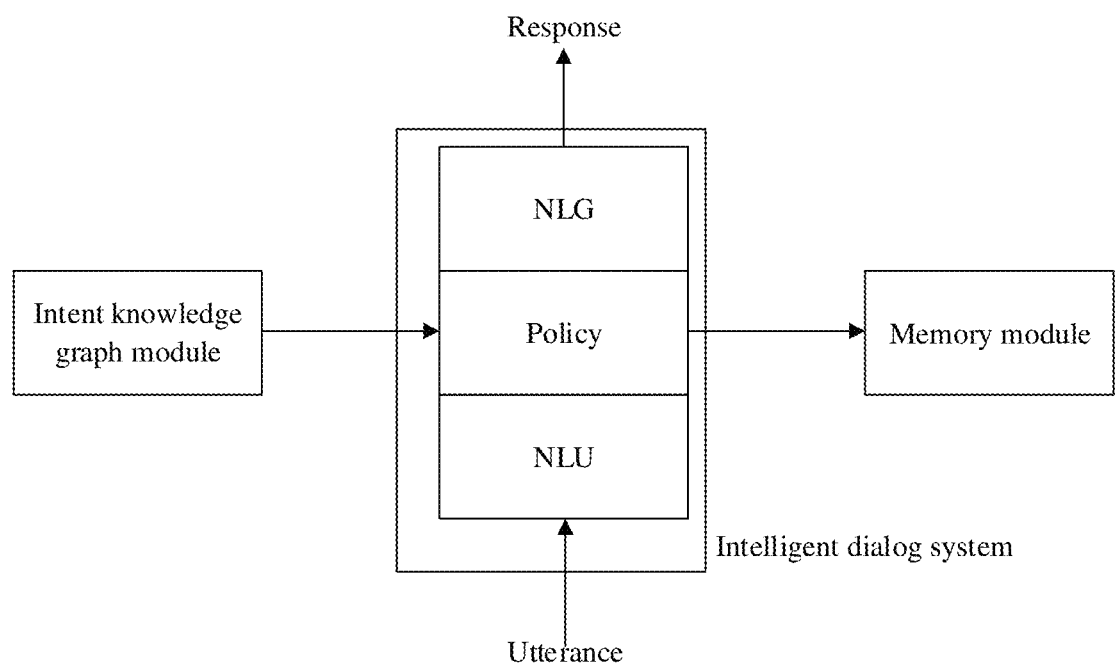
FIG. 3 is an application architecture diagram of a dialog method according to this embodiment.

For example, FIG. 3 is an application architecture diagram of a dialog method according to this embodiment. Referring to FIG. 3 and steps S201-S205, a main structure of the intelligent dialog system to perform the functions of steps S201-S205 may be placed in a central control part of the intelligent dialog system. That is, the pre-trained rewriting model, decision-making model and reply generation model are all integrated into the central control of the intelligent dialog system. An intent knowledge graph module and the memory module may be placed in the intelligent dialog system, or placed outside the intelligent dialog system, provided that they are accessible to the intelligent dialog system at any time and related information can be acquired. As shown in FIG. 3, when receiving the dialog information of the user, i.e., Utterance, the central control of the intelligent dialog system first performs Natural Language Understanding (NLU) to understand the dialog information of the user. Then, a policy may be determined according to steps S201-S204, and the to-be-used dialog action information may be determined. Then, a reply statement Response is generated based on a Natural Language Generation (NLG) technology according to step S205. In the process of determining the policy, reference may be made to the dialog state and the attribute information of the user that includes a user portrait and historical preferences and is stored in the memory module. The dialog state is created based on an intent unit retrieved from the intent knowledge graph module. During the dialog with the user, all the dialog information is stored in the memory module in real time. Therefore, all the dialog information of each dialog of the user with the intelligent dialog system may be stored in the memory module. If the user is currently having a dialog with the intelligent dialog system, all the dialog information in the current dialog and prior to the current dialog information may also be stored, as well as the attribute information of the user extracted based on all the historical dialog information of the user.

Figure 4:
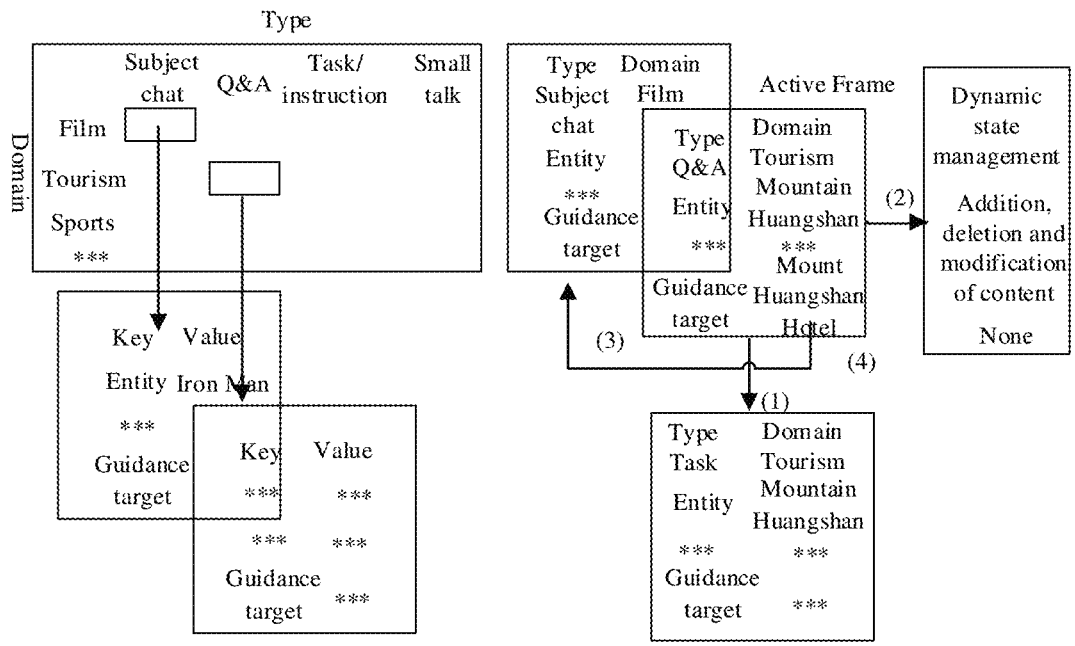
FIG. 4 is a schematic diagram of an operating state of an intelligent dialog system according to this embodiment.

For example, FIG. 4 is a schematic diagram of an operating state of an intelligent dialog system according to this embodiment. As shown in FIG. 4, in order to facilitate effective management of dialog states, different types of dialogs in each domain correspond to a dialog state box. Each dialog state may adopt a multi-layer frame structure in a Key-Value storage manner, which may also be called a frame box. As shown in the left part of FIG. 4, subject chat under a film domain and question and answer under a tourism domain each correspond to a frame box. In combination with the description in the above embodiments, each frame box corresponds to an entity or a task, and each frame box includes a guide item, such as a guidance target as shown in FIG. 4, configured to indicate a set of next frames that may be moved on after the current frame is completed, corresponding to edges between different frames. The right part of FIG. 4 is a schematic diagram of operation of the central control of the intelligent dialog system. As can be seen, as the dialog with the user proceeds, the central control also maintains a dialog state changing diagram formed by frame state diagrams. Each frame state corresponds to a dialog state. For example, if the intent corresponding to the dialog information of the user is a new intent, which corresponds to the state transition step 1 in FIG. 4, in which a new frame box is added. In this case, an intent unit corresponding to the intent is retrieved from an intent knowledge graph, and then a frame box is created based on the intent unit. Next, in the state transition step 2 in FIG. 4, dynamic state management for the current frame box is involved. The dynamic state management in this embodiment involves adding, deleting and modifying the content in the frame box. In the state transition step 3 in FIG. 4, it is assumed that one type of dialog with the user involves another type of dialog. If another type of dialog is completed, return to the previous type of dialog. Correspondingly, in the central control of the intelligent dialog system, since each type of dialog corresponds to a frame box, a state of the frame box also returns to the previous frame box. In the state transition step 4 in FIG. 4, when the question and answer is completed, the intelligent dialog system can actively guide the user to the next frame box based on the guidance target in the current frame box.

In this embodiment, strong central control of the intelligent dialog system is realized by using machine learning models such as the rewriting model, the decision-making model and the reply generation model.

Figure 5:
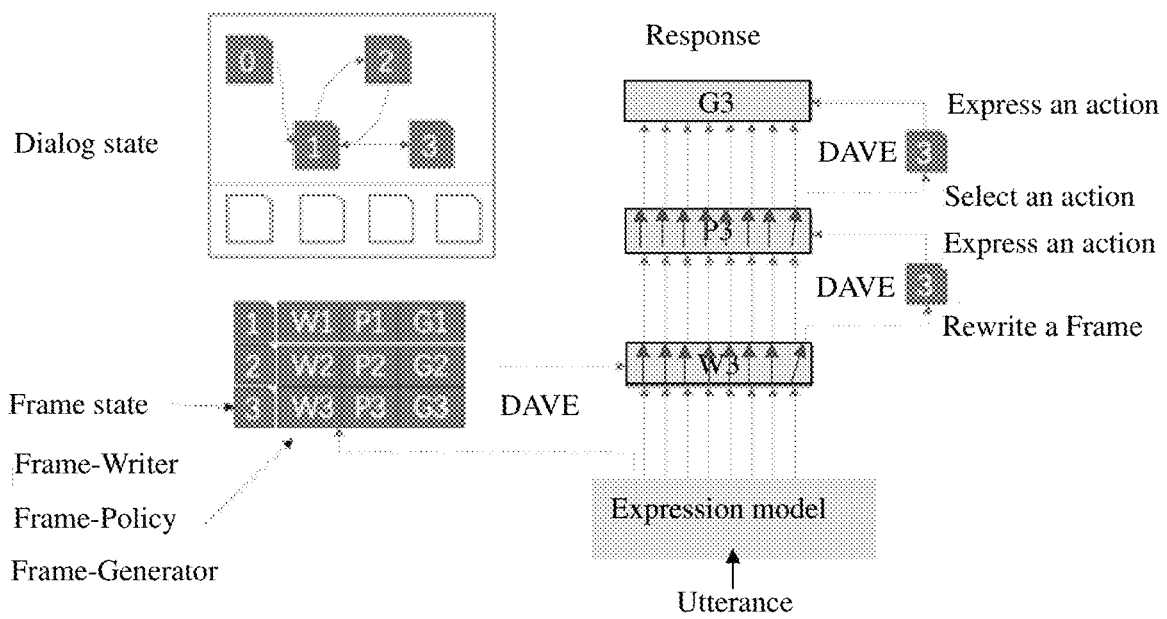
FIG. 5 is a schematic diagram of an operating principle of the intelligent dialog system according to this embodiment.

FIG. 5 is a schematic diagram of an operating principle of the intelligent dialog system according to this embodiment. As shown in FIG. 5, the state transition in FIG. 4 is described by taking 4 dialog states 0, 1, 2, 3 in its upper left corner as examples. The state 0 may be considered as a ready state. The user first conducts a dialog in the state 1 with the intelligent dialog system, transitions to a dialog in the state 2 during the dialog in the state 1, returns to the dialog in the state 1 after the dialog in the state 2 is completed, and continues a dialog in the state 3 after the dialog in the state 1 is completed. Each state corresponds to an intent, that is, to a frame, so each state may also be called a frame state. In this embodiment, each state corresponds to a task. In this manner, the same task may be invoked multiple times and managed in a frame, so as to ensure a more effective dialog with the user.

In combination with the descriptions of steps S201-S205 in the above embodiment, the operations of the rewriting model, the decision-making model and the reply generation model may be realized in each frame state. For example, refer to the lower left corner shown in FIG. 5. In each frame state, the rewriting model, the decision-making model and the reply generation model corresponding thereto may be trained. The rewriting model may also be called a writer, the decision-making model may also be called an action selection policy, and the reply generation model may also be called a generator. As shown in the lower left corner of FIG. 5, the rewriting model, the decision-making model and the reply generation model corresponding to the state 1 may be W1, P1 and G1 respectively, the rewriting model, the decision-making model and the reply generation model corresponding to the state 2 may be W2, P2 and G2 respectively, and the rewriting model, the decision-making model and the reply generation model corresponding to the state 3 may be W3, P3 and G3 respectively. As shown on the right of FIG. 5, after the dialog information of the user, i.e., the Utterance, is received, the Utterance is first vectorized by using an expression model and then inputted to the rewriting model W3, and the rewriting model W3 first extracts an intent of the dialog information of the user, acquires a corresponding dialog state frame based on the intent, and rewrites the dialog state frame based on the dialog information. The vectorized dialog information and the rewritten dialog state frame are inputted to the decision-making model P3. The decision-making model P3 may select an action based on the inputted information, that is, dialog action information to be used for the dialog information. Finally, the vectorized dialog information and the selected action are inputted to the reply generation model G3 to allow the reply generation model G3 to generate a reply statement Response.

It is to be noted that the intelligent dialog system in this embodiment may be designed as an end-to-end model. The dialog state frames of different intents may share a rewriting model, a decision-making model and a reply generation model. Alternatively, the rewriting models, the decision-making models and the reply generation models of the dialog state frames of different intents are the same in structure, but have independent specific parameters. That is, the rewriting model, the decision-making model and the reply generation model corresponding to the dialog state frame of each intent are trained separately.

The decision-making model and the reply generation model in this embodiment may be realized by using a Discrete Variational Auto-Encoder (DVAE).

Based on the above, it may be known that the dialog method according to the present disclosure may assist decision-making and implementation of the generic requirements of the user based on active and multi-type dialogs. For example, after the user has an initial requirement, through the communication with the intelligent dialog system, the user's understanding of requirement-related background knowledge may be improved, and the user's exact requirements may be clarified and refined during the understanding. This process may inevitably involve many types of dialogs, including general small talks, question and answer, thematic in-depth chats, and task oriented dialogs. In addition, in order to make the whole process more efficient, the intelligent dialog system according to the present disclosure also has the capability to actively guide the dialog, to meet the user's requirements in a one-stop manner.

For example, Table 1 below shows a plurality of rounds of dialogs realized between a user and the intelligent dialog system by using the technical solution in the embodiment shown in FIG. 2, in which user denotes dialog information of the user, and bot denotes a reply statement of the intelligent dialog system.

Table 1 user The school holiday is coming and I want to go out to climb a mountain
bot I also like to climb mountains. I know many famous mountains and great rivers
user Do you know Mount Huangshan
bot Yes, I certainly know. Mount Huangshan has four uniques, strange pines, absurd stones, sea of clouds and hot springs. How comfortable it is to climb the mountain and soak in a hot spring
user Ha-ha, I'm a little touched by what you said. Please buy a ticket for me.
bot Ok, when do you want to go
user The day after tomorrow. School was out then
bot May I have your ID number, please?
user****
bot Ok, I've got it. Do you need to see the weather of Mount Huangshan?
user By the way, what's the weather like in Mount Huangshan in the next few days bot There will be showers at Mount Huangshan the day after tomorrow. Mount Huangshan will begin to turn cloudy three days from now
user I think I'll go there three days from now
bot Ok, can I help you change the ticket of the scenic spot?
user Ok
bot It has been modified. Please confirm the order Based on the dialog shown in the table above, it may be known that the user's initial requirement is a generic requirement. With the in-depth chat with the intelligent dialog system, the user may be actively guided to help the user to clarify his/her requirement more accurately, which really helps the user to solve problems and effectively improves the user's experience.

The rewriting model, the decision-making model and the reply generation model in this embodiment may be trained in a supervised or unsupervised manner. The two training manners may also be combined. First, the three models may be trained as a whole at the same time in a supervised manner, and then each model is trained separately in an unsupervised manner. For example, unsupervised training may be performed by using the training data as described in Table 1 above. During the training, parameters of the three models are adjusted by using only one loss function. In addition, in the supervised training, annotation data may be added to train each model separately. For example, if the rewriting model is to be trained in a supervised manner, an intent corresponding to the dialog information of the user may be annotated to train an intent extraction capability of the rewriting model. If the decision-making model is to be trained in a supervised manner, to-be-used dialog action information corresponding to the dialog information of the user may be annotated to train a decision-making capability of the decision-making model. In this case, the three models correspond to three loss functions, and may be trained separately or trained together. Refer to relevant model training knowledge for details, which are not described herein.

With the dialog method according to this embodiment, by using the above solution, dialog action information may be determined, and the user may be actively guided to have a dialog, which further enriches functions of the dialog, improves the efficiency of the dialog, can also well meet the user's generic requirement, and can effectively improve the user's experience. Moreover, the dialog method according to this embodiment may be implemented by using a rewriting model, a decision-making model and a reply generation model, which can further improve the intelligence of the dialog.

Figure 6:
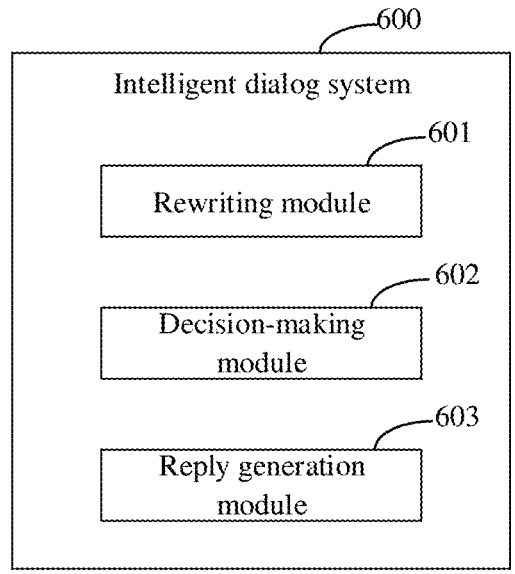
FIG. 6 is a schematic diagram according to a third embodiment of the present disclosure.

FIG. 6 is a schematic diagram according to a third embodiment of the present disclosure. As shown in FIG. 6, this embodiment provides an intelligent dialog system 600, including:
- a rewriting module 601 configured to rewrite a corresponding dialog state based on received dialog information of a user;
- a decision-making module 602 configured to determine to-be-used dialog action information based on the dialog information of the user and the dialog state; and
- a reply generation module 603 configured to generate a reply statement based on the dialog information of the user and the dialog action information.

The implementation principle and the technical effect of implementing a dialog by using the above modules in the intelligent dialog system 600 according to this embodiment are the same as those in the above related method embodiment. Refer to the descriptions of the above related method embodiment for details, which are not described in detail herein.

Further optionally, in the intelligent dialog system according to this embodiment, the rewriting module 601 is further configured to:
extract a corresponding intent based on the dialog information of the user; and
acquire the corresponding dialog state based on the intent.

Further optionally, in the intelligent dialog system according to this embodiment, the rewriting module 601 is configured to:
detect whether the intent is a new intent;
retrieve a corresponding intent unit from an intent knowledge graph if yes; and
create the corresponding dialog state based on the intent unit.

Further optionally, in the intelligent dialog system according to this embodiment, the rewriting module 601 is configured to:
retrieve the dialog state corresponding to the intent from a historical state library of the user if the intent is not a new intent.

Further optionally, in the intelligent dialog system according to this embodiment, the decision-making module 602 is configured to:
determine the to-be-used dialog action information based on the dialog information of the user and the intent corresponding to the dialog information recorded in the dialog state; or
determine the to-be-used dialog action information based on the dialog information of the user, the intent corresponding to the dialog information recorded in the dialog state and a dialog guide item recorded in the dialog state.

Further optionally, in the intelligent dialog system according to this embodiment, the decision-making module 602 is configured to:
determine the to-be-used dialog action information based on the dialog information of the user and the dialog state and with reference to historical dialog information of a current dialog of the user, historical memory information of the user and/or attribute information of the user.

Further optionally, in the intelligent dialog system according to this embodiment, the rewriting module 601 is configured to:
rewrite a corresponding dialog state based on the received dialog information of the user by using a pre-trained rewriting model;
the decision-making module 602 is configured to:
determine to-be-used dialog action information based on the dialog information of the user and the dialog state by using a pre-trained policy model; and/or
the reply generation module 603 is configured to:
generate a reply statement based on the dialog information of the user and the dialog action information by using a pre-trained reply generation model.

Acquisition, storage and application of users' personal information involved in the technical solutions of the present disclosure, such as acquisition, storage and application of dialog information of the users, comply with relevant laws and regulations, and do not violate public order and moral.

According to embodiments of the present disclosure, the present disclosure further provides an electronic device, a readable storage medium and a computer program product.

Figure 7:
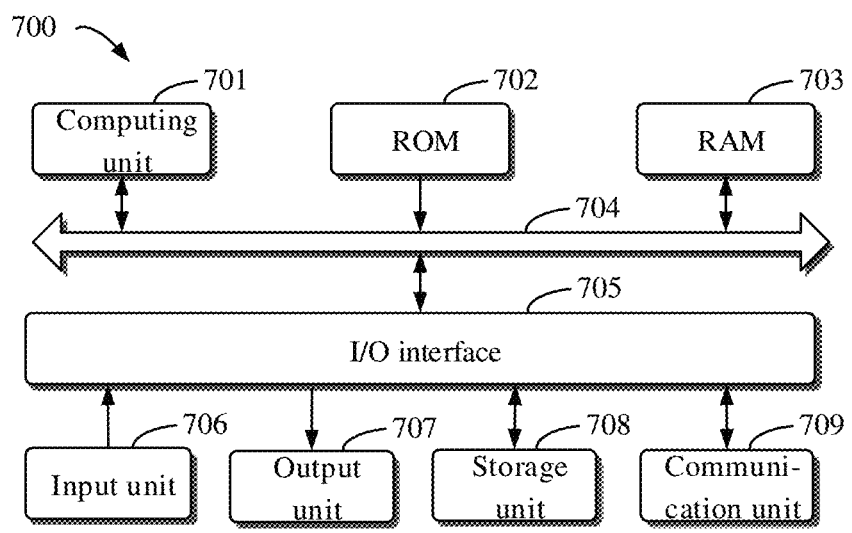
FIG. 7 is a block diagram of an electronic device configured to perform a dialog method according to an embodiment of the present disclosure.

FIG. 7 is a schematic block diagram of an exemplary electronic device 700 configured to implement embodiments of the present disclosure. The electronic device is intended to represent various forms of digital computers, such as laptops, desktops, workbenches, PDAs, servers, blade servers, mainframe computers and other suitable computing devices. The electronic device may further represent various forms of mobile devices, such as PDAs, cellular phones, smart phones, wearable devices and other similar computing devices. The components, their connections and relationships, and their functions shown herein are examples only, and are not intended to limit the implementation of the present disclosure as described and/or required herein.

As shown in FIG. 7, the device 700 includes a computing unit 701, which may perform various suitable actions and processing according to a computer program stored in a read-only memory (ROM) 702 or a computer program loaded from a storage unit 708 into a random access memory (RAM) 703. The RAM 703 may also store various programs and data required to operate the device 700. The computing unit 701, the ROM 702 and the RAM 703 are connected to one another by a bus 704. An input/output (I/O) interface 705 is also connected to the bus 704.

A plurality of components in the device 700 are connected to the I/O interface 705, including an input unit 706, such as a keyboard and a mouse; an output unit 707, such as various displays and speakers; a storage unit 708, such as disks and discs; and a communication unit 709, such as a network card, a modem and a wireless communication transceiver. The communication unit 709 allows the device 700 to exchange information/data with other devices over computer networks such as the Internet and/or various telecommunications networks.

The computing unit 701 may be a variety of general-purpose and/or special-purpose processing components with processing and computing capabilities. Some examples of the computing unit 701 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 801 performs the methods and processing described above, such as the dialog method. For example, in some embodiments, the dialog method may be implemented as a computer software program that is tangibly embodied in a machine-readable medium, such as the storage unit 708. In some embodiments, part or all of a computer program may be loaded and/or installed on the device 700 via the ROM 702 and/or the communication unit 709. One or more steps of the dialog method described above may be performed when the computer program is loaded into the RAM 703 and executed by the computing unit 701. Alternatively, in other embodiments, the computing unit 701 may be configured to perform the dialog method by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, an RAM, an ROM, an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, speech input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the protection scope of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the protection scope of the present disclosure.

What is claimed is:

1. A computer-implemented dialog method for an intelligent dialog system, wherein the method comprises, implemented at an intelligent dialog system, the steps of:
   receiving dialog information from a user, extracting a corresponding intent based on the dialog information of the user, acquiring the corresponding dialog state based on the intent, expressing the received dialog information in the form of a vector by using a pre-trained expression model, and inputting the vectorized dialog information into a pre-trained rewriting model to rewrite the corresponding dialog state based on the received dialog information of the user;
   determining to-be-used dialog action information based on the dialog information of the user and the dialog state by using a pre-trained policy model; and
   generating a reply statement based on the dialog information of the user and the dialog action information by using a pre-trained reply generation model,
   wherein the step of acquiring the corresponding dialog state based on the intent comprises:
   detecting whether the intent is a new intent;
   retrieving a corresponding intent unit from an intent knowledge graph if the intent is a new intent, wherein the intent unit is of a three-layer frame unit structure, comprising a first layer which is a name of an entity or a task, a second layer which is classification information related to the entity or task of the first layer, and a third layer which comprises common expression statements around features of the second layer, and wherein the intent knowledge graph comprises a plurality of intent units and is obtained by mining information of historical dialogs with all users, and a guide item in each intent unit serve as an edge connecting different intent units;
   creating the corresponding dialog state based on the intent unit; and
   retrieving the dialog state corresponding to the intent from a historical state library of the user if the intent is not a new intent.

2. The method according to claim 1, wherein the step of determining to-be-used dialog action information based on the dialog information of the user and the dialog state comprises:
   determining the to-be-used dialog action information based on the dialog information of the user and the intent corresponding to the dialog information recorded in the dialog state; or
   determining the to-be-used dialog action information based on the dialog information of the user, the intent corresponding to the dialog information recorded in the dialog state and a dialog guide item recorded in the dialog state.

3. The method according to claim 2, wherein the step of determining to-be-used dialog action information based on the dialog information of the user and the dialog state comprises:
   determining the to-be-used dialog action information based on the dialog information of the user and the dialog state and with reference to historical dialog information of a current dialog of the user, historical memory information of the user and/or attribute information of the user.

4. An electronic device, comprising:
   at least one processor; and
   a memory communicatively connected with the at least one processor;
   wherein the memory stores instructions executable by the at least one processor, and the instructions are executed by the at least one processor to enable the at least one processor to perform a dialog method for an intelligent dialog system, wherein the dialog method comprises, implemented at an intelligent dialog system, the steps of:
   receiving dialog information from a user, extracting a corresponding intent based on the dialog information of the user, acquiring the corresponding dialog state based on the intent, expressing the received dialog information in the form of a vector by using a pre-trained expression model, and inputting the vectorized dialog information into a pre-trained rewriting model to rewrite the corresponding dialog state based on the received dialog information of the user;
   determining to-be-used dialog action information based on the dialog information of the user and the dialog state by using a pre-trained policy model; and
   generating a reply statement based on the dialog information of the user and the dialog action information by using a pre-trained reply generation model,
   wherein the step of acquiring the corresponding dialog state based on the intent comprises:
   detecting whether the intent is a new intent;
   retrieving a corresponding intent unit from an intent knowledge graph if the intent is a new intent, wherein the intent unit is of a three-layer frame unit structure, comprising a first layer which is a name of an entity or a task, a second layer which is classification information related to the entity or task of the first layer, and a third layer which comprises common expression statements around features of the second layer, and wherein the intent knowledge graph comprises a plurality of intent units and is obtained by mining information of historical dialogs with all users, and a guide item in each intent unit serve as an edge connecting different intent units;
   creating the corresponding dialog state based on the intent unit; and
   retrieving the dialog state corresponding to the intent from a historical state library of the user if the intent is not a new intent.

5. The electronic device according to claim 4, wherein the step of determining to-be-used dialog action information based on the dialog information of the user and the dialog state comprises:
  determining the to-be-used dialog action information based on the dialog information of the user and the intent corresponding to the dialog information recorded in the dialog state; or
  determining the to-be-used dialog action information based on the dialog information of the user, the intent corresponding to the dialog information recorded in the dialog state and a dialog guide item recorded in the dialog state.

6. The electronic device according to claim 5, wherein the step of determining to-be-used dialog action information based on the dialog information of the user and the dialog state comprises:
  determining the to-be-used dialog action information based on the dialog information of the user and the dialog state and with reference to historical dialog information of a current dialog of the user, historical memory information of the user and/or attribute information of the user.

7. A non-transitory computer readable storage medium with computer instructions stored thereon, wherein the computer instructions are used for causing a computer to perform a dialog method for an intelligent dialog system, wherein the dialog method comprises, implemented at an intelligent dialog system, the steps of:
  receiving dialog information from a user, extracting a corresponding intent based on the dialog information of the user, acquiring the corresponding dialog state based on the intent, expressing the received dialog information in the form of a vector by using a pre-trained expression model, and inputting the vectorized dialog information into a pre-trained rewriting model to rewrite the corresponding dialog state based on the received dialog information of the user;
  determining to-be-used dialog action information based on the dialog information of the user and the dialog state by using a pre-trained policy model; and
  generating a reply statement based on the dialog information of the user and the dialog action information by using a pre-trained reply generation model,
  wherein the step of acquiring the corresponding dialog state based on the intent comprises:
  detecting whether the intent is a new intent;
  retrieving a corresponding intent unit from an intent knowledge graph if the intent is a new intent, wherein the intent unit is of a three-layer frame unit structure, comprising a first layer which is a name of an entity or a task, a second layer which is classification information related to the entity or task of the first layer, and a third layer which comprises common expression statements around features of the second layer, and wherein the intent knowledge graph comprises a plurality of intent units and is obtained by mining information of historical dialogs with all users, and a guide item in each intent unit serve as an edge connecting different intent units;
  creating the corresponding dialog state based on the intent unit; and
  retrieving the dialog state corresponding to the intent from a historical state library of the user if the intent is not a new intent.

\* \* \* \* \*